United States Patent [19]

Benton et al.

[11] Patent Number: 5,121,229
[45] Date of Patent: Jun. 9, 1992

[54] SELF-CONTAINED COMPACT MULTI-COLOR EDGE-LIT HOLOGRAPHIC DISPLAY

[75] Inventors: Stephen A. Benton, Lincoln; Sabrina M. Birner, Cambridge, both of Mass.

[73] Assignee: Msssachusetts Institute of Technology, Cambridge, Mass.

[21] Appl. No.: 391,441

[22] Filed: Aug. 9, 1989

[51] Int. Cl.⁵ .............................................. G03H 1/22
[52] U.S. Cl. .............................................. 359/32; 359/1
[58] Field of Search ............. 350/3.6, 3.7, 174, 162.12, 350/3.69, 3.85, 3.86, 162.17; 359/32

[56] References Cited

U.S. PATENT DOCUMENTS

| | | | |
|---|---|---|---|
| 3,633,989 | 1/1972 | Benton | 350/3.85 |
| 4,445,749 | 5/1984 | Benton | 350/3.69 |
| 4,498,729 | 2/1985 | Benton | 350/3.69 |
| 4,512,624 | 4/1985 | Nicholson | 350/3.69 |
| 4,643,515 | 2/1987 | Upatnieks | 350/3.67 |
| 4,737,001 | 4/1988 | Moss | 350/3.6 |
| 4,807,971 | 2/1989 | Nurano | 350/13.6 |

Primary Examiner—Bruce Y. Arnold
Assistant Examiner—J. P. Ryan
Attorney, Agent, or Firm—Robert K. Tendler

[57] ABSTRACT

A three-step process is combined with an edge-lit system to provide a self-contained, maximally-compact holographic display. In one embodiment, a hologram is affixed to an upstanding transparent support plate mounted through the top of a housing in which the hologram is edge-illuminated with white light from a source in the housing immediately beneath the plate to generate brilliant, sharp and deep multi-color images which straddle the hologram plane. In another embodiment, the transparent support plate is mounted in a frame which carries the edge-illumination source. All displays may either be free-standing or wall-mounted, as desired.

18 Claims, 6 Drawing Sheets

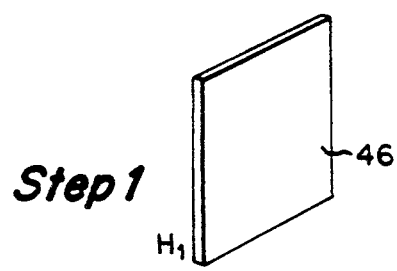
Step 1
*Fig. 3A*
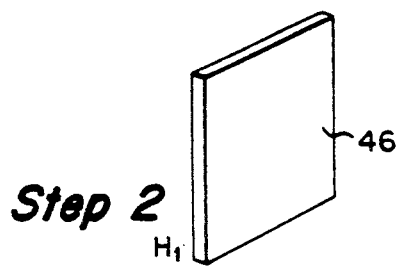
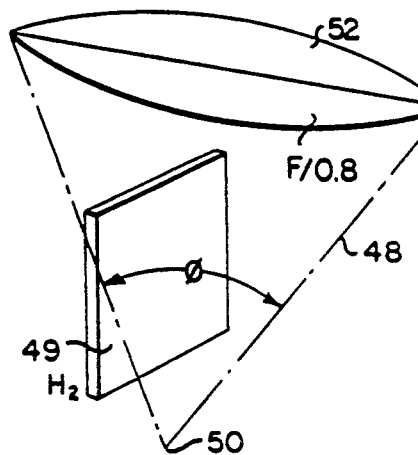
Step 2
*Fig. 3B*
Reconstruction
*Fig. 3C*
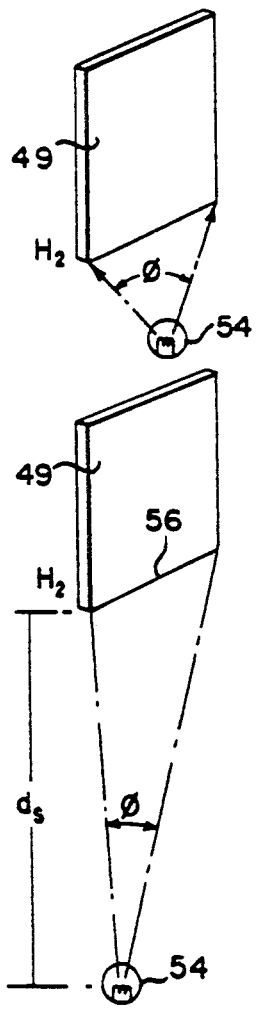
*Fig. 3D*

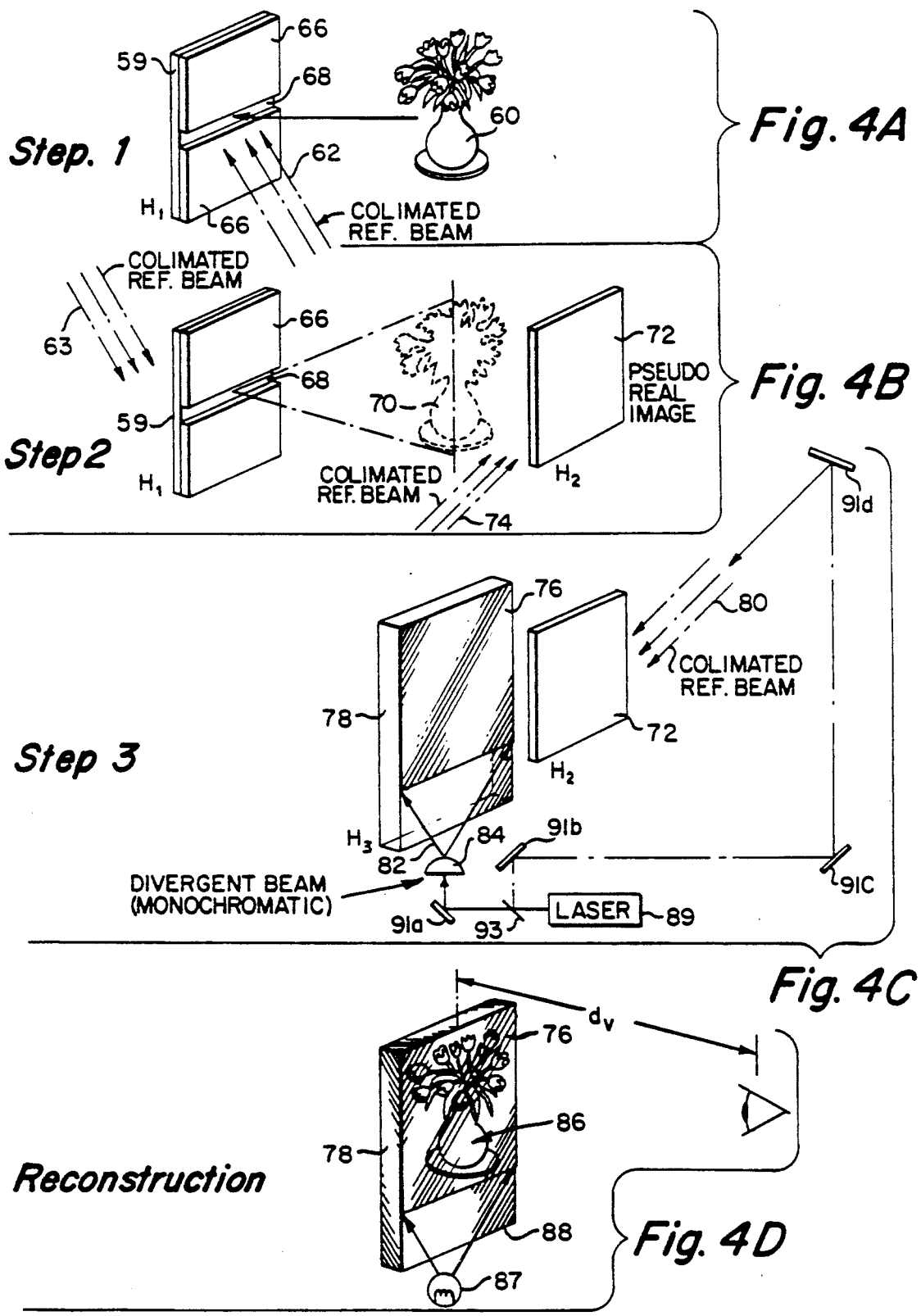

SELF-CONTAINED COMPACT MULTI-COLOR EDGE-LIT HOLOGRAPHIC DISPLAY

FIELD OF INVENTION

This invention relates to holographic displays and more particularly to a method and apparatus for providing a self-contained compact display in which real multi-color dimensional images are available.

BACKGROUND OF THE INVENTION

In the past, holographic displays, especially those intended for artistic purposes, have included a hologram mounted to a wall which is illuminated by a source that is precisely spaced from and angled above the hologram such that a virtual image exists either behind or in front of the hologram. For museums, art galleries, or in-home display of the art work, such constraints on the ability to view the display limits the availability of such art forms to the public. In the past, such art works have generally been limited to display in areas in which a plain wall is in back of the hologram so that the virtual image, if in fact viewed, is viewed against a plain background. Moreover, since the public is used to focusing at the art work itself as opposed to focusing at infinity, the result is that some members of the public do not even see the virtual image produced by the hologram. This is because their normal focus is at the surface of the hologram itself and not in front or beyond. Additionally, precisely locating an illumination source is difficult because of the requirement of locating the illumination source away from a wall or at a point where there is no existing building structure.

Nevertheless, virtual image holograms are useful in so-called "heads up" displays in which the hologram is mounted to a windshield either of a motor vehicle or an aircraft, and in which the image exists at infinity. It will be appreciated that it is the purpose of these displays to display the indicated data at infinity, which is where the individual normally has his eyes focused. The patents to Gaylard E. Moss describe such virtual image holograms. These patents include U.S. Pat. Nos. 4,790,613, 4,737,001, 4,807,951 and 4,795,223. Moreover, in addition to only virtual images being supplied by the Moss patents, these patents involve edge illumination of holograms, with the hologram running completely down the windshield to the point at which light is injected into the edge of the windshield. In one embodiment, illumination is provided through the use of light pipes or fiber optics.

As mentioned, such virtual image holograms are neither convenient nor usable in the gallery or art work display setting. Moreover, since they are designed for viewing in a fixed position, as by the operator of the vehicle or aircraft, such holograms are not required to provide the three-dimensional quality for which holography is best known. In contradistinction to the virtual images produced by Moss real holographic images at the hologram permit the observer to walk part way around the image produced by the hologram such that the image presents different aspects when viewed from different angles. For instance, holograms depicting statuary are desirably real image holograms which give the observer the appearance of the statuary being at a position where the observer can at least partially walk around it so as to observe it from a number of angles.

It will also be appreciated that the Moss patents involve monochromatic images in that the thickness of the hologram is typically on the order of 30 microns for the Moss process. Holograms of this thickness filter the light and limit its wave band. They are thus incapable of producing multi-color images.

Another virtual image hologram is illustrated in U.S. Pat. No. 4,643,515 issued to Juris Upatnieks. This holographic technique provides a monochromatic virtual image at infinity behind an edge-lit hologram. Moreover, as can be seen from this patent, the hologram extends directly to the illuminated edge of the carrier. These constraints militate against the utilization of this type of hologram for museum or gallery use. It will also be appreciated that this Upatnieks patent is one in which a compact display is not possible due to reconstruction involving a laser positioned at a distance from the hologram.

Since a multi-color display is desirable for artistic purposes, white light illumination is preferred and wideband diffraction is a prerequisite. Note that the Upatnieks system produces images which contain both vertical as well as horizontal parallax, such that they would become blurred if illuminated with a white light source, due to spectral smearing. By way of further background, another Upatnieks patent, namely U.S. Pat. No. 4,223,975, details the process of the reconstruction of a virtual image.

In none of the above-mentioned patents is the image at or near the plane of the hologram. In the past, there has been a transition from looking through the hologram at a virtual image floating behind the hologram to looking at a real image that is at or near the plane of the hologram producing the image.

Although not edge-lit, one type of real image produced at or adjacent the hologram is discussed in U.S. Pat. No. 4,512,624 issued to Peter Nicholson. In this patent, a two-step process is utilized for producing a hologram which is reconstructed with a diverging beam of white light. For a compact display, the hologram should be edge-lit with the diverging reconstruction beam formed from a source located very close to the hologram. This is only possible in a two-step process with an impractically large f/0.5 converging lens. For practical f/3.0 converging lenses, the result for Nicholson is that the reconstruction source must be located at such a distance from the hologram that the source must be outside of a practical display housing or box.

Moreover, the elliptical mask utilized in forming the first hologram in the Nicholson patent is wholly ineffective in preventing deblurring for white light illumination. Given the ratios of 1:3 in this patent, and given a horizontal dimension to the hologram of a couple of feet, then the oval aperture would be approximately eight inches in the vertical direction. This would have virtually no effect to deblur a white light hologram, with the Nicholson deblurring being limited to, at most, a few inches from the hologram plane.

Deblurring is a major problem with respect to white light illuminated holograms because the individual color components are diffracted to different locations. Deblurring techniques for white light illuminated multicolor holograms are discussed in U.S. Pat. Nos. 4,623,215 to Kaveh Bazargan; and, 3,603,668 to Dominick John DeBitetto. U.S. Pat. No. 3,754,808 to Burton Ross Clay, et al, involves a hologram recorded with coherent energy of a predetermined wavelength, with the hologram being read out with broad banded energy, and with a predispersion diffraction grating utilized for deblurring. The U.S. Pat. No. 3,633,989 to Stephen A. Benton describes a narrow horizontal slit technique for limiting blurring by eliminating vertical parallax. This reduces information content in an effort to make a low bandwidth stereoscopic hologram of the subject, with a narrow horizontal aperture of a couple of millimeters being the means for limiting the vertical parallax.

A further Benton patent, namely U.S. Pat. No. 3,944,322, is primarily directed to the utilization of a flexible polarizing sheet for eliminating background light which would otherwise degrade the quality of the stereoscopic image.

More importantly, U.S. Pat. No. 4,498,729 to Benton describes a hologram production technique in which the slit technique of the aforementioned Benton patent is utilized in a three-step hologram recording process. In this three-step process, a diffraction grating is used for making an achromatic hologram. The method described in this patent refers to the steps of a making a monochromatic hologram on a first photographic plate, making a diffraction grating by exposing a second photographic plate to a series of co-linear point sources of mutually coherent monochromatic light, developing and bleaching the exposed plate to produce the diffraction grating, making a second hologram by exposing a third holographic plate to an image from a narrow elongated strip of the first hologram with the diffraction grating in the optical path, and making an achromatic hologram by holographically recording the image produced by illuminating the second hologram with monochromatic light on a fourth photographic plate. All of the holograms are recorded on photographic films or on thin plates with photographic emulsions, with this three-step process resulting in a hologram which when illuminated with white light produces an image in which colors are missing, i.e. a black and white image is produced. This diffraction grating is what is responsible for the production of the black and white hologram image, with the result being the provision of a neutral tone for viewing. While exceptionally sharp achromatic images are produced by this white light transmission holographic technique, its use in the artistic world is limited due to its achromatic nature, when color is desired, or due to the complexity of the method. Note that no edge-lit technique is described in this patent. Moreover, this patent does not teach the mounting of the final relatively thin hologram on a transparent block or support plate, as is required for edge-lit systems. Nor is any elongated white light source taught.

SUMMARY OF THE INVENTION

When the three-step Benton process, minus the diffraction grating, is used along with his slit technique and the final hologram is mounted on a transparent support plate which acts as a wave guide, it has been found that a highly diverging white light source can be located exceptionally close to the edge of the hologram to provide a maximally compact display. Note, the elimination of the diffraction grating in the three-step process mentioned above permits generation of a sharp, multi-color holographic real image.

As to advantages, the edge-lit display is self-contained needing no complicated instructions for use. No additional equipment is necessary such as remote light sources or tripods. The display may be free-standing or wall-mounted, as desired, in either framed or unframed form. Moreover, the hologram will always be seen because proper illumination is assured. The self-contained display also reduces the load for people traveling with a hologram to exhibit. Additionally, the maximally-compact display is desirable from the point of curators who shy away from more space-consuming displays. Further, the subject display is more convenient for home use than traditional hologram systems. As an additional advantage, coating the edge opposite the illuminated edge results in the elimination of zeroth order beam. This also results in the hologram image appearing self-luminous. It also has been found that ambient light does not affect image reconstruction since the image is bright enough to be shown in a lit room. This is because the reconstruction conditions do not play back a noticeable secondary image. Thus, the viewing room need not be specially prepared. As an added feature, the display may be wall-mounted, pedestal-mounted or simply placed on top of a desk.

In one embodiment, a hologram is mounted to a freestanding transparent plate which is edge-illuminated with white light from immediately beneath the plate to generate brilliant, sharp and deep multi-color images which straddle the hologram plane. The resultant real image has a pleasing rainbow of hues depending on viewing position. Alternatively, the use of multiple slits during hologram recording permit formation of different images having different colors. In another embodiment, the support plate may be mounted in a frame which carries the edge-illuminating source.

In the three-step process, a first generation master hologram produces a pseudoscopic or reversed-depth real image at a second master hologram. The second master projects an orthoscopic or correct-depth real image to permit recording a third hologram, which when edge-lit produces an orthoscopic real image which can be made to straddle the third hologram. In one embodiment, the third hologram is mounted on the support plate with its lower edge displaced from the illuminated edge of the plate, with the reconstruction optics arranged to directly illuminate the hologram through the plate.

While the vertical parallax elimination slit provides significant deblurring, at least within a rather broad optimal viewing range of 12 to 24 inches from the display, it is the use of multiple slits which permits generating images each having a different block Color. For instance, a vase holding flowers can be made green, whereas the flowers in the vase can be made red. Alternatively, a relatively sharp, single slit image has a pleasing "rainbow" effect, such that as the sharp image is viewed from different vertical positions, the image changes color.

Additionally, in one embodiment, an elongated white light source running perpendicular to the plane of the hologram is located adjacent the illuminated edge of the plate carrying the hologram to provide for exceptional brilliance. Here, the line source preferably subtends less than 10°. The extended light source is not particularly position-dependent, at least in the fore and aft directions, while at the same time coupling at least in order of magnitude more light into the region of the hologram than is possible with a diverging point source. In one embodiment, the extended light source includes a quartz halogen lamp with a line filament which is on the order of 10 millimeters long and 1 millimeter wide.

In a preferred embodiment, black or absorptive material is coated onto the edge of the hologram opposite the edge-lit edge of the plate so as to eliminate light escaping at this edge. The result is that a plate may be vertically mounted to a rectilinear housing so that the plate extends above the housing, with the light source being mounted within the housing adjacent the edge of the plate. Here, the hologram is affixed to one side of the plate and is spaced from the illuminated edge.

The entire structure may be pedestal mounted; or, the display may be simply placed on a shelf or table. The result is that a sharp, multi-color image is produced at the display to provide a three-dimensional effect for viewing, with no special other lighting being required. The hologram may thus be viewed without the necessity of providing a plain wall backdrop because the back side of the plate may be painted if desired.

As mentioned, the hologram on the glass or other transparent plate need not extend down to the illuminated edge; but, rather, in a preferred embodiment, is displaced from this edge. This means that the hologram may be located at any convenient distance from the illuminated edge of the plate.

What is therefore provided is a sharp, multi-color real image in the plane of the hologram which is viewable stereoscopically by walking around the display, with the display being capable of being pedestal mounted and having its own internal light source in a compact enclosure. Care is taken so that in the three-step process of making the hologram, the second holographic plate is exposed very close to the location at which the final hologram is to be situated. The result is an exceptionally wide viewing angle of 60°. Also, with a horizontal slit aperture of a couple of millimeters, deblurred viewing images can have a depth which extends at least to half the distance between the observer and the holographic plate.

In the three-step process, it will be appreciated that the first hologram, $H_1$, is recorded with a collimated reference beam. This hologram is read out with a collimated reference beam parallel to the first, but in an opposite direction, to produce a virtual image. The distance at which the image of the object is formed in this case will be exactly where the eventual third hologram, $H_3$, is to be formed. The second hologram, $H_2$, is placed behind that point, but fairly close to it, for the purposes of wide-angle viewing. In the process of recording $H_2$, the second hologram is illuminated with a collimated monochromatic beam as a reference beam. In the reconstruction, the final hologram $H_3$ is recorded by illuminating the $H_2$ hologram with a collimated monochromatic beam parallel to the collimated beam used to record $H_2$, but in the opposite direction. This projects back out an image of the object into space where the third hologram will be located, with the third hologram needing to be fairly accurately centered in that space. Unlike that which is taught in the prior Benton patent, in producing the third hologram, it is mounted on a block or in a tank to increase the effective edge of the hologram and therefore permit larger amounts of light to be introduced into the emulsion. This reduces exposure time in the recording of the $H_3$ hologram, and also permits practical edge illumination in the reconstruction process. Here a monochromatic highly diverging reference beam is provided which enters at the edge of the block, support plate or tank and overlays the light from the second hologram. The highly diverging reference beam is quite easily produced with an f/0.5 diverging lens. The purpose of the three-step process is to permit the use of a highly diverging lens as opposed to the impractically large, highly converging lens required by the two-step process of Nicholson. Since the white light source is to be at the same location as the diverging point for the beam which produced the reference beam used in making the $H_3$ hologram, the three-step process permits the use of this simple diverging lens system in the recording process and permits locating white light source very close to the $H_3$ hologram. This, in turn, provides for the adjacency of the illuminating source to the edge of the plate, and thus the compactness and transportability of the display. With the above-mentioned elongated source, maximal brilliance is achieved, with fore and aft positioning not being critical. Note, that each of the holograms is produced in a thin film of no more than several microns thickness so as to achieve a multi-color dispersion and thus a multi-color result.

The display thus formed can be utilized not only for art or decorative purposes, but also can be utilized in CAD/CAM applications as well as in medical imaging. Thus, aside from providing a display on a pedestal, with a hologram mounted on a glass plate for viewing in much the same way a statue is viewed, the subject technique may be utilized in other applications where a stereoscopic multi-color real image is to exist at a predetermined position in space. In terms of medical instruction, such holograms may be utilized in the absence of providing a physical model of the object to be studied.

BRIEF DESCRIPTION OF THE DRAWINGS

FIGS. 3A–3D illustrate an edge-lit two-step method for producing real holographic images, illustrating the necessity of an impractically large converging lens;

FIGS. 4A–4D illustrate the utilization of a three-step process for producing a real holographic image to enable the provision of a maximally compact display;

DETAILED DESCRIPTION

Figure 1:
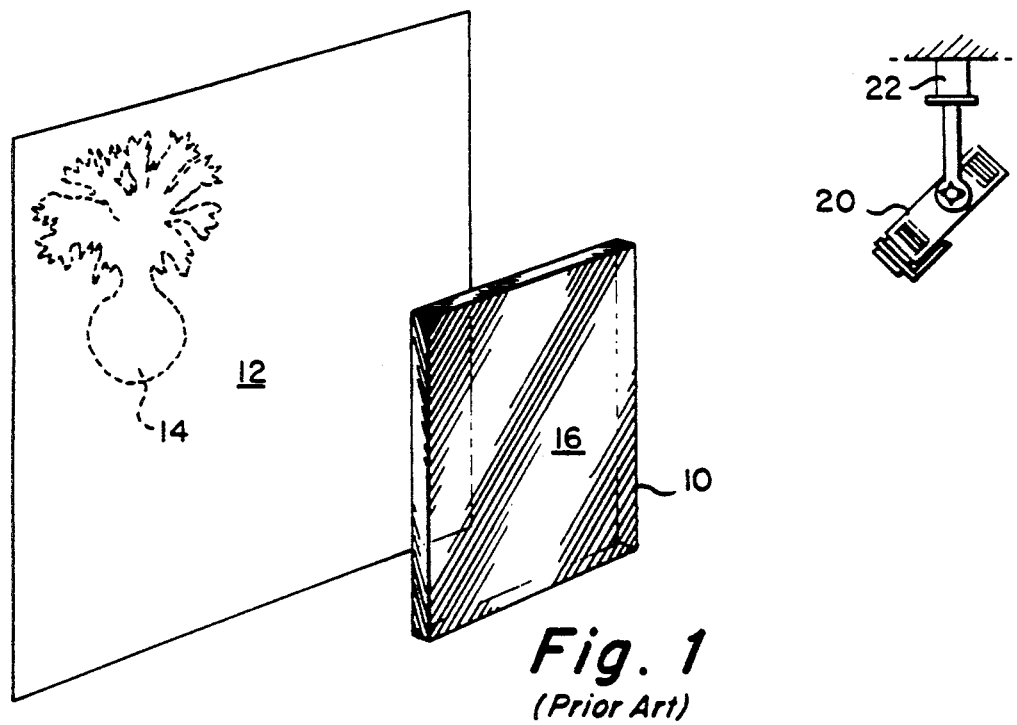
FIG. 1 is a diagrammatic illustration of a conventional holographic display which produces a virtual image behind the hologram and in which the concentrated reconstruction beam originates far from the surface of the illuminated hologram.

It is a general goal of holographic displays that they be as self-contained and compact as possible so as to approach as closely as possible the attributes of conventional artistic displays. Holograms inevitably require a fairly specific and concentrated source of illumination for best image quality, and the provision of such spotlight-type illumination has been a significant obstacle to the wider proliferation of the medium for technical as well as decorative use. Thus, there is considerable interest in the development of a strategy for a self-contained and compact hologram-plus-illumination system, which may require a new type of hologram, and a new type of hologram player or display/illumination mount.

The illumination for almost all two-step holograms is required to be collimated, e.g. parallel rays, or only a weakly diverging beam, for minimal image distortion.

This generally requires that the light source used to reconstruct the final image be placed a considerable distance, at least seven feet from the hologram, and thus in a separate housing, typically as a spotlight on a nearby ceiling or wall.

Alternatively, to bring the light source close to the hologram, a collimating lens can be provided within the display. Such a lens would be heavy and expensive if produced in solid plastic or glass. A much lighter and cheaper Fresnel lens would introduce scattered light that would degrade the image. In both cases, the practical upper limit of the ratio of lens width to focal length is about 0.33, i.e. an f/3 lens. This means that the light source plus lens assembly must be bigger than the hologram itself, considerably compromising the goal of a compact assembly.

A more compact display could be provided if a strongly diverging illumination source, as from a bare unfocused quartz-halogen lamp, were used in the Nicholson two-step process. This can only occur if the two-step hologram had been created with a corresponding strongly converged reference beam from a strongly converging lens.

Unfortunately, the production of a beam that converges as rapidly as the illumination diverges would require optics that are virtually unknown in holographic practice, which is roughly limited to f/3 optics. For a compact edge-lit display, the two-step process would require optics between f/0.5 and f/1.0. The production of such lenses with diameters of twelve inches or more would literally costs tens or hundreds of thousands of dollars, and has not been attempted.

In contradistinction, the subject three-step process allows the displayed $H_3$ hologram to be recorded with a f/0.5 diverging lens with exactly the same divergence as the intended illumination. with the f/0.5 diverging lens being available commercially at moderate cost.

The combination of strongly diverging illumination and edge-lit lighting allows a maximally compact and practical display. Note, there is almost no possibility of a viewer seeing the illumination beam, because the light is piped nearly parallel to the plane of the hologram for direct illumination. Thus, the light source can be brought even closer to the hologram than for a conventionally illuminated hologram.

Moreover, in the subject system, there is virtually no limit to how close a bare light bulb can be brought to a hologram and still provide acceptably uniform illumination, as most such bulbs are transparent in all directions except toward their bases. Instead, the practical problem becomes one of keeping the bulb from being easily visible, and thus distracting or annoying to the viewer. Assuming a rectilinear hologram, in terms of defining the distance that the source of the diverging beam is spaced from the bottom edge of a hologram, it is only necessary to note that the source should at least uniformly illuminate the entire bottom edge of the hologram. The spacing of the source from this bottom edge defines the angular beamwidth; and thus, the corresponding beamwidth of the monochromatic diverging reference beam used in exposing the third hologram. Having defined this angular beamwidth, a diverging lens producing this beam is used. In general, this lens will have an f number less than 1.0. The practical limit to the spacing is thus the size of the diverging lens; or, more importantly, the distance of the lower edge of the $H_3$ hologram to the bottom edge of the plate.

Referring now to FIG. 1, in the past, artistic holographic works have been displayed through the utilization of a hologram 10 adjacent a plane wall 12 in which a virtual image 14 exists beyond the plane 16 of hologram 10. It will be appreciated that proper positioning of a concentrated monochromatic illumination source 20 from the hologram is critical to the formation of the virtual image. In general, the light source is physically mounted as by a bracket 22 to some building structure. As illustrated, the light source is usually located above and at some distance from the surface of the hologram. As mentioned, not only is the location of the light source both critical and difficult due to the lack of suitably arranged building structures on which to mount the light source, the virtual image produced in this manner is often times not seen by the viewing public because of focusing problems.

Figure 2:
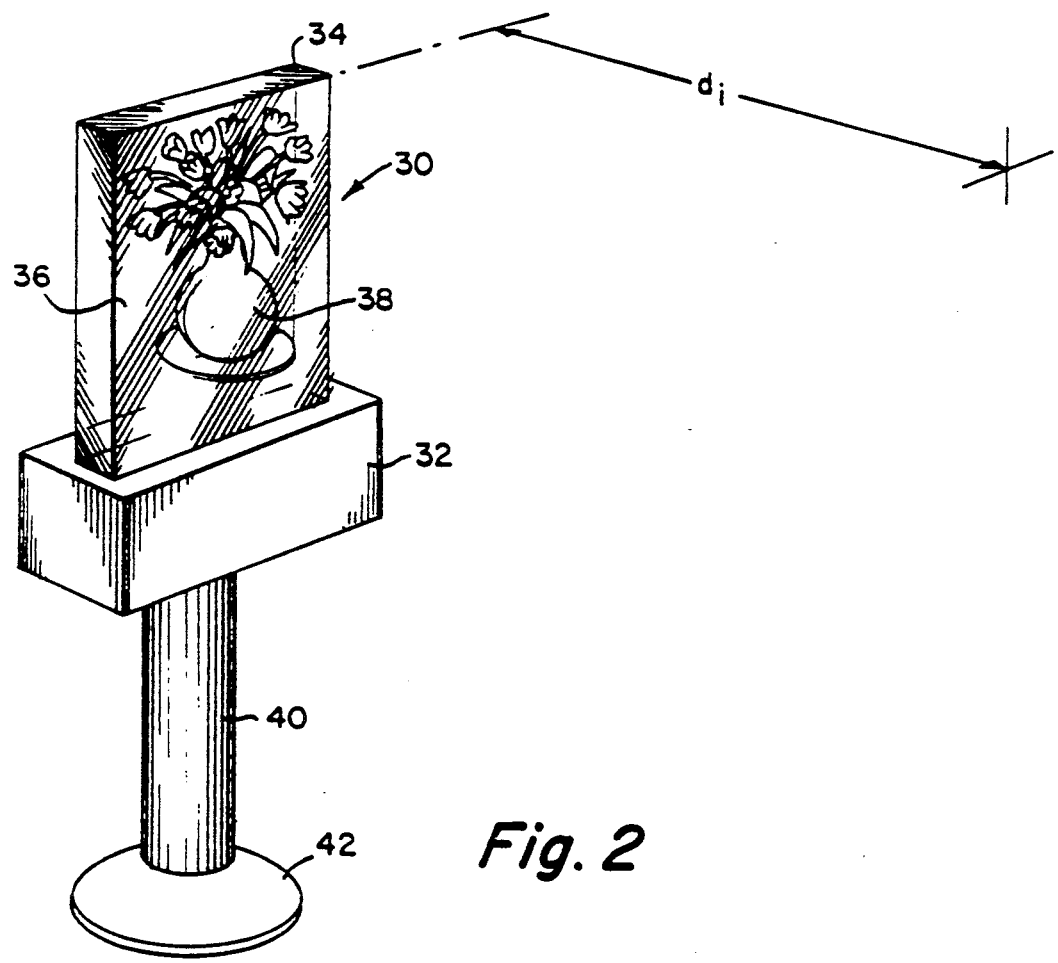
FIG. 2 is a diagrammatic illustration of the subject compact, self-contained, edge-lit, multi-color holographic display, indicating the generation of a real holographic image in the plane of the hologram.

In contradistinction to the rather cumbersome and often times monochromatic display system of FIG. 1, referring to FIG. 2, in the subject invention, a compact free-standing self-contained holographic display 30 includes a light source in a housing 32 from which protrudes a transparent support plate 34 on which is mounted a hologram 36. As will be seen, the hologram can be conveniently mounted anywhere above the housing without a requirement that the edge of the hologram extend down to the illuminated edge of the plate. Through the utilization of the aforementioned three-step process and a highly diverging white light source adjacent the edge of plate 36, a real image 38 straddles the hologram plane in which the image is both sharp and multi-color assuming the utilization of the aforementioned narrow slit procedure.

It will be appreciated that housing 32 may be mounted on a pedestal 40 having a base 42 such that the display may be located anywhere within a gallery. Alternatively, housing 32 may be simply placed on a shelf or table. It will be appreciated, therefore, that the display produces a real image which may be viewed stereoscopically in much the same way as statuary.

As illustrated in FIG. 2, the intended viewing distance $d_v$ relates to the optimal non-blurred viewing range which, in the subject invention, is between 12 and 24 inches in one embodiment.

As can be seen and will be demonstrated, the display is maximally compact and offers an extremely sharp multi-color image which is easily viewed in a gallery setting.

Referring now to FIGS. 3A, 3B and 3C, an edge-lit two-step process is described to illustrate the necessity of providing an impractically large lens to provide a compact display. Referring to FIG. 3A, a master hologram $H_1$, here shown at 46, is made of an object such as a vase 47 in the manner described in the aforementioned Nicholson patent. To provide a second master, hologram 46 is utilized to make a second hologram $H_2$, here shown as 49, in which the $H_2$ hologram is recorded via a steeply or heavily converging beam illustrated at 48 to subtend an angle $\phi$ which, if the focus of the beam 50 is to be located close to the edge of the hologram, for a five inch by four inch hologram, $\phi = 64°$. This corresponds to the illumination of a five inch wide by four inch high hologram from a distance corresponding to the diagonal of such a hologram in which tangent 100 $/2 = 2\frac{1}{2}$ inches divided by $4\frac{1}{2}$ inches or 64°. A converging lens, here illustrated at 52, would have to have an f/number of approximately 0.8 in order to be able to provide such a steeply convergent beam which is focused at 50 and which divergence matches the required divergence for close source placement. This is illustrated in FIG. 3C by a point source 54 of white light, which produces a beam that subtends the angle $\phi$ in order to completely illuminate the bottom edge of hologram 48. It will be appreciated in FIG. 3C that reconstruction is accomplished through a point source of white light in which the point source is located at the focal point 50 of the beam utilized for production of the $H_2$ hologram.

Referring to FIG. 3D, for a practical f/3 lens, it will be appreciated that the distance, $d_s$, of the point source 54 would be more than a foot from the edge 56 of the hologram since the beam width for an f/3 lens would be on the order of 19°. Thus, with practical converging lenses, the closest that a point source could be located to a practical sized hologram would be outside any housing for a compact display.

Referring to FIGS. 4A, 4B and 4C, the aforementioned three-step process for providing a real holographic image includes creating a master hologram $H_1$, here illustrated at 59, from an object 60, in which this hologram is illuminated with a collimated reference beam generally indicated at 62 to be approximately 45° from the line between the object and the hologram. The master hologram 59 is provided with a mask 66 having a slit 68 therein, which provides for the aforementioned deblurring.

Once the hologram 59 is made in a conventional manner, a collimated reference beam is utilized to play out the master $H_1$ hologram to produce a virtual image 70 in a plane corresponding to the final location of the $H_3$ hologram to be finally produced. A pseudoscopic real image is recorded on the $H_2$ hologram here illustrated by reference character 72, which recording requires a collimated reference beam 74. It will be noted that a collimated reference beam 63, used to read out the $H_1$ master hologram, is parallel to collimated reference beam 62 but is in an opposite direction.

Likewise, in order to record the $H_3$ hologram 76 located on a transparent plate or block 78, the $H_2$ hologram 72 is read out by a collimated reference 80 which is parallel to reference beam 74, but opposite in direction. Here, it will be noted that in the formation of the $H_3$ hologram, a divergent reference beam 82 is provided through a highly diverging lens 84, with the divergence of the lens 84 corresponding to the divergence from a white light source 87 in FIG. 4D. With respect to FIGS. 4A-4C, all illumination to this point is monochromatic. Moreover, the $H_3$ hologram is index-matched to the plate.

With respect to exposing the $H_3$ hologram, the following details the process: First, it is important in recording the $H_3$ hologram that the $H_2$ image straddle the plate used to make the $H_3$ hologram. In one embodiment, the film is index-matched to a relatively thick two inch thick transparent block of glass through the use of xylene. The diverging reference beam is introduced to this film through an edge of the support plate or block and the $H_2$ hologram is read out with collimated monochromatic light. After developing in a process which leaves the film transparent, the film is mounted and index matched to the support plate, in one instance, $\frac{1}{2}''$ plexiglas. In one embodiment, the index matching material is optical epoxy such as optical adhesive #68 from Norland Products Inc. of North Brunswick, N.J.

Referring to FIG. 4D, in the reconstruction of a real image 86, here a white light source 87 is located beneath an adjacent edge 88 of plate 78 such that the divergent beam from the light source directly impinges at least upon the entire lower, or bottom, edge of hologram 76. As illustrated, both the divergent beam 82 and the collimated reference beam 80 are produced by a monochromatic source such as laser 89, with the output beam being redirected by mirrors 91a-91d to provide the requisite beams, and with a conventional splitter 93 being used in the process.

By way of illustration, what can be seen is that white light source 87 is located closely adjacent edge 88 of support plate 76; and, therefore, quite close to the bottom edge of hologram 76. In terms of the illuminated edge of hologram 76, in one practical embodiment, light source may be no more than four inches away from the illuminated edge of the hologram; and, therefore, may be quite closely adjacent the illuminated edge 88 of plate 78.

Rather than being a good distance away from the illuminated edge of the hologram, in the subject invention, due to the three-step process, it is practical to locate the white light source as adjacent the hologram as practical to provide a maximally compact display, with the distance in question being the distance of the illuminated edge of the hologram to the illuminated edge of the support plate. As to this distance, it desirably allows clearance for the support plate as the plate extends down into its housing. Note, the hologram can be mounted anywhere up the face of the support plate to displace the holographic image from the stand as desired.

Figure 5:
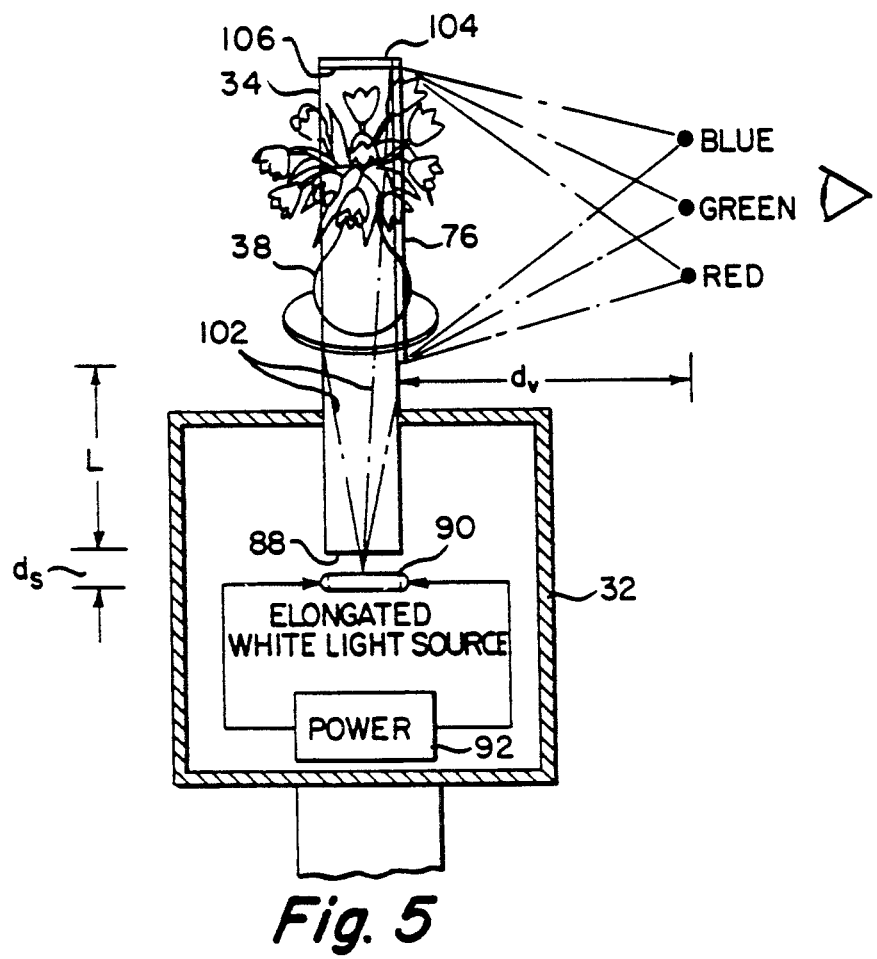
FIG. 5 is a side and diagrammatic illustration of the utilization of an elongated white light source for this display of FIG. 2.
Figure 6:
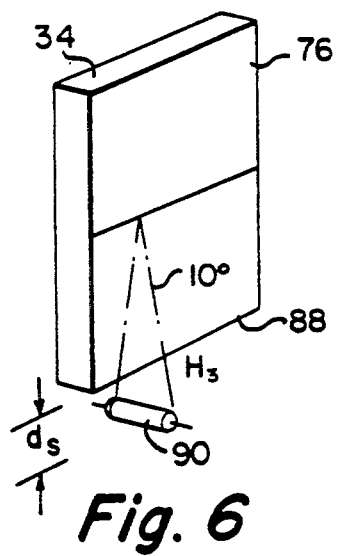
FIG. 6 is a diagrammatic illustration of the angle to be subtended by the elongated source of FIG. 5.

Referring now to FIG. 5, the real holographic image 38 straddles, at least in part, the plane of hologram $H_3$. Here, an elongated white light source 90 is located adjacent the bottom edge 88 of plate 34 and is positioned perpendicular to the plane of the support plate, such that it lies fore and aft by an amount which subtends; for instance, 10° as illustrated in FIG. 6. In a preferred embodiment, the length of the extended source does not exceed the width of the support plate; and, in one embodiment, the support plate is $\frac{1}{2}''$ thick plexiglas. As mentioned hereinbefore, the utilization of an elongated source increases the brilliance of the image produced by the hologram by ten-fold over that achievable with a point source. Note, the elongated source is powered as illustrated at 92 so as to provide relatively direct illumination of the $H_3$ hologram as illustrated by dotted lines 102. Support plate 34 is optionally provided with an absorber 104 at the top edge 106 to prevent escape of light from this edge of the plate.

It will be appreciated that while real images are described, the subject technique can be made to produce virtual images within a few feet of the hologram. As such, these near-in virtual images are within the scope of this invention.

It will also be appreciated that the subject display can be mounted to an upstanding wall, such that the display is hung like a picture.

Figure 7A:
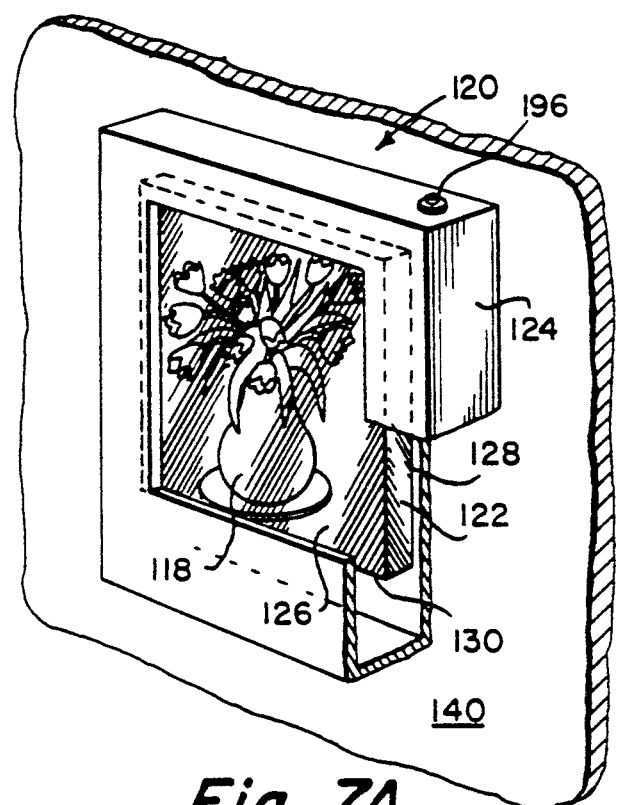
FIGS. 7A–7D are diagrammatic illustrations of wall-mounted displays.

In this regard and referring to FIGS. 7A, a holographic image 118 is provided by a display 120 in which a support plate 122 is mounted within a frame 124, shown in partial cross-section, with the hologram 126 mounted to the front surface of the support plate and with a dark, preferably black, layer 128 mounted to the back of support plate 122. The illumination source (not shown in this figure) is located beneath the bottom edge 130 of support plate 128, as described hereinbefore.

It will be noted that the frame with the support plate hologram and source may be conveniently mounted to a wall 140, as illustrated.

Figure 7B:
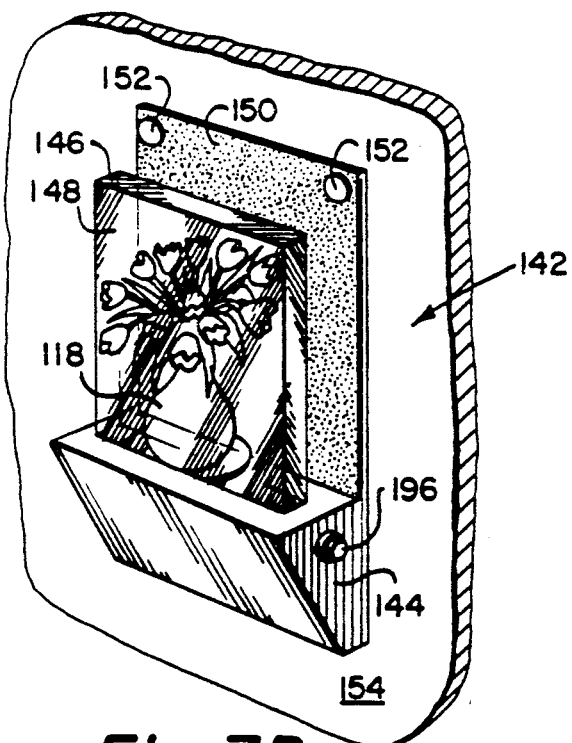

Referring to FIG. 7B, rather than having the plate supported within a frame, the wall-mounted unit 142 may be include a tapered base portion 144 from which the free-standing support plate 146 emerges. The hologram 148 is mounted to the front surface of support plate 146, with a black background being provided by a free-standing black sheet 150 which is spaced from the rear surface of plate 146. Mounting of the free-standing support plate with hologram thereon may be accomplished in any conventional manner as by virtue of fasteners 152 which affixed sheet 150 to wall 154.

Figure 7C:
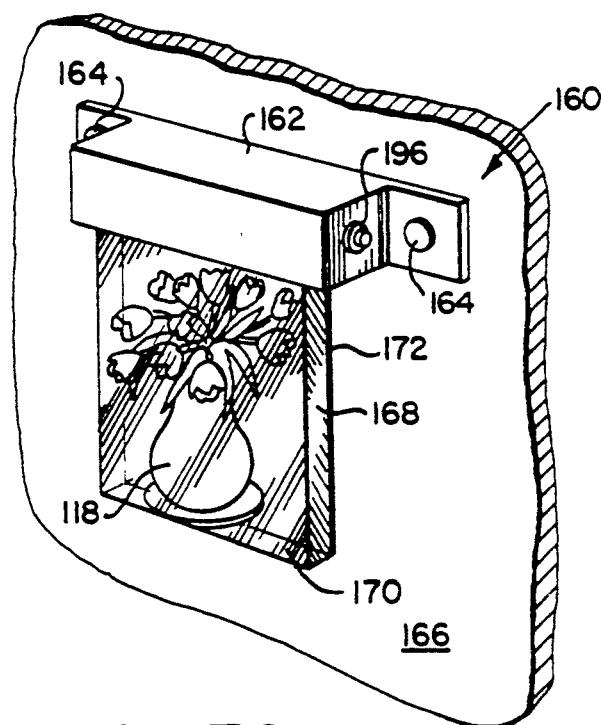

The free-standing support plate may be mounted so as to project downwardly as illustrated in FIG. 7C in which wall-mounted display 160 has a housing 162 mounted by fasteners 164 to a wall 166, with support plate 168 depending downwardly as illustrated. Support plate 168 is provided with a hologram 170 on the face thereof and with black backing material 172 at the rear surface.

Figure 7D:
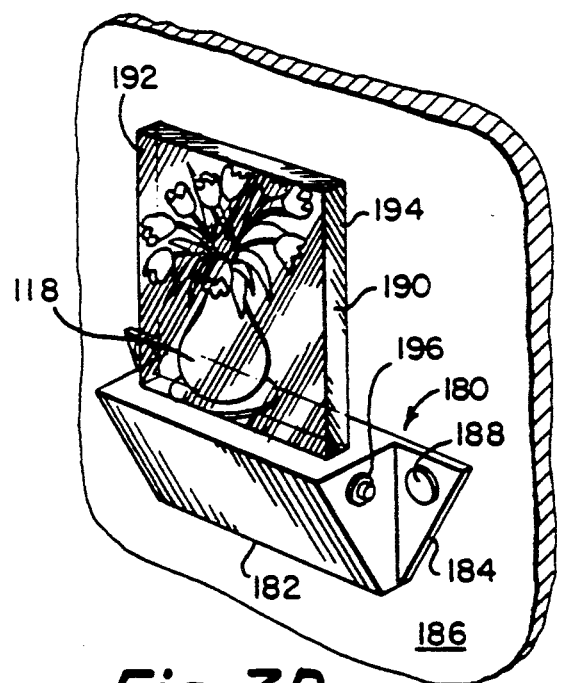

Referring to FIG. 7D, the free-standing wall-mounted unit or display 180 is shown to include a tapered base 182 having flanges 184 which are affixed to wall 186 by virtue of fasteners 188. Here, the free-standing plate 190 projects upwardly from the base and includes a hologram 192 on the front surface, with a blackened layer 194 on the rear surface.

The difference between the FIG. 7B and 7D embodiments is that the black or dark colored background, as the case may be, which is optional, may be either spaced from the back of the plate at the wall or may be actually affixed to the back of the support plate. Note also that in all instances, on/off switches for the display, such as illustrated by reference character 196, may be provided for any of the displays shown in FIGS. 7A–7D. It will be appreciated that electric power for the source may either be from AC current or the display may be battery powered as desired.

Having above indicated a preferred embodiment of the present invention, it will occur to those skilled in the art that modifications and alternatives can be practiced within the spirit of the invention. It is accordingly intended to define the scope of the invention only as indicated in the following claims:

We claim:

1. A maximally compact edge-lit multi-color, de-blurred holographic display comprising:
   a light-transmissive plate;
   a hologram mounted to said plate and produced in a three-step process including recording of a first master hologram, recording of a second master hologram through reconstruction of an image from a slit-like illumination of the first master hologram and recording of the first-mentioned hologram through reconstruction of an image from the second master hologram; and
   means for illuminating an edge of said plate with a diverging beam of white light, said means being configured such that all reconstructive illumination enters the edge of said plate.

2. The display of claim 1 wherein said illuminating means includes a white light source extended in a direction perpendicular to the plane of said hologram.

3. The display of claim 1 wherein said illuminating means is spaced from said edge by an amount not exceeding the longest dimensioned of said hologram.

4. The display of claim 1 wherein said illuminating means is spaced from said edge.

5. A compact holographic display, comprising:
   a transparent plate having a hologram mounted to a surface portion thereof;
   a housing;
   means for supporting said plate through said housing such that the portion of said plate having said hologram mounted thereon extends from said housing, an edge of said plate being exposed within said housing; and,
   a source of white light mounted in said housing adjacent the edge of said plate, such that said hologram is illuminated from a position spaced from an edge of said hologram, said source being positioned such that all reconstructive illumination enters the edge of said plate within said housing.

6. The display of claim 5 and further including absorbing means at the edge of said plate opposite the bottom edge thereof, whereby the zeroth order beam is eliminated.

7. The display of claim 5 and further include a dark backing mounted at the transparent plate opposite the surface portion to which said hologram is mounted.

8. The display of claim 7 wherein said backing is mounted to a back surface of said transparent plate.

9. The display of claim 7 wherein said backing is mounted in spaced adjacency to said transparent plate.

10. The display of claim 5 and further including a means for mounting said display to a wall.

11. The display of claim 5 wherein said display is free-standing.

12. The display of claim 5 and further including a frame around at least a portion of said transparent plate.

13. A compact holographic display, comprising:
   a transparent plate having a hologram mounted to a surface portion thereof;
   a housing;
   means for supporting said plate through said housing such that the portion of said plate having said hologram mounted thereon extends from said housing, an edge of said plate being exposed within said housing; and,
   a source of white light mounted in said housing adjacent to the edge of said plate within said housing, such that said hologram is edge-lit from a position spaced from an edge of said hologram, all reconstruction illumination entering the edge of said plate, said display further including a dark backing mounted at the transparent plate opposite the surface portion to which said hologram is mounted.

14. A display of claim 13 wherein said backing is mounted to a back surface of said transparent plate.

15. The display of claim 13 wherein said backing is mounted in spaced adjacency to said transparent plate.

16. A compact holographic display, comprising:
   a transparent plate having a hologram mounted to the surface portion thereof, said hologram having a bottom edge spaced from the bottom edge of said plate;
   a housing;
   means for supporting said plate through said housing in an upstanding position such that the portion of said plate having said hologram mounted thereon extends above said housing, a bottom edge of said plate being exposed within said housing;
   a source of white light mounted in said housing adjacent to the bottom edge of said plate, such that said hologram is illuminated from a position spaced from the bottom edge of said hologram; and, means for mounting said display to a wall.

17. A compact three-dimensional holographic display, comprising:
a hologram having a bottom edge;
a housing;
means for supporting said hologram through said housing in an upstanding position such that a portion of said hologram extends above said housing, a bottom edge of said hologram being exposed within said housing; and, a source of white light mounted in said housing adjacent to the bottom edge of said hologram, such that said hologram is illuminated from a position spaced from the bottom edge of said hologram to produce an image at or adjacent the surface of said hologram, thereby to provide a three-dimensional image compact holographic display.

18. A multi-color display comprising:
a hologram mounted to a light transmissive plate with an edge; and
means for illuminating said edge with white light such that all reconstructive illumination enters said edge and such that an image is formed in the immediate vicinity of said hologram.

* * * * *